United States Patent Office 3,589,917
Patented June 29, 1971

3,589,917
**CONCRETE RESISTANT TO SCALING
AND SPALLING**
Robert C. Hedlund, Midland, Mich., assignor to Dow
Corning Corporation, Midland, Mich.
No Drawing. Filed Aug. 15, 1967, Ser. No. 660,608
Int. Cl. C09k *3/00*
U.S. Cl. 106—12
22 Claims

ABSTRACT OF THE DISCLOSURE

The surface of concrete is treated with a silane or a siliconate before it becomes finally set. In the preferred embodiment, evaporation of the water from the concrete is controlled by conventional methods such as the use of membrane curing compounds. The resulting concrete is resistant to scaling and spalling.

---

This invention relates to concrete having a surface that is resistant to scaling and spalling, and to a method for making such a concrete.

More specifically, this invention relates to concrete resistant to scaling and spalling whose surface has been treated with (1) a silane of the formula $QSiX_3$ wherein Q is a hydrocarbon or substituted hydrocarbon radical and X is a readily hydrolyzable radical or (2) an alkali metal monoalkyl siliconate having from 1 to 4 carbon atoms in the alkyl group.

This invention also relates to a process of pouring concrete, the improvement which comprises applying to the surface of the concrete within about 2 hours after it has been screeded, a compound selected from the group consisting of (1) silanes having the general formula $QSiX_3$ wherein Q is a hydrocarbon or substituted hydrocarbon radical and X is a readily hydrolyzable radical, and (2) an alkali metal monoalkyl siliconate having from 1 to 4 carbon atoms in the alkyl group, whereby the surface of the concrete is rendered resistant to scaling and spalling.

This invention further relates to an improvement in a process of pouring concrete which includes the use of moisture control means to prevent the excessive loss of moisture during the curing of the concrete, the improvement comprising applying to the surface of the concrete within about 2 hours after it has been screeded but not later than the time at which the moisture control means is applied, a compound selected from the group consisting of (1) silanes having the general formula $QSiX_3$ wherein Q is a hydrocarbon or substituted hydrocarbon radical and X is a readily hydrolyzable radical, and (2) an alkali metal monoalkyl siliconate having from 1 to 4 carbon atoms in the alkyl group, whereby the surface of the concrete is made resistant to scaling and spalling.

This invention still further relates to a composition consisting essentially of a solution of (I) a compound selected from the group consisting of (1) silanes having the general formula $QSiX_3$ wherein Q is a hydrocarbon or substituted hydrocarbon radical and X is a readily hydrolyzable radical, and (2) an alkali metal monoalkyl siliconate having from 1 to 4 carbon atoms in the alkyl group, and (II) a membrane curing compound.

The Q radical of the silanes used in accordance with this invention can be any hydrocarbon or substituted hydrocarbon radical. Thus, for example, Q can be an alkyl, alkenyl, alkynyl, cycloalkyl, cycloalkenyl, aryl, alkaryl, or an aralkyl radical, as well as a corresponding halo, amino (and amine salts), hydrazine, cyano, isocyano, epoxy, carboxy, carbonyl, ether, thioether, nitro, amide, hydroxy, mercapto, oxime, cyanato, isocyanato, isothiocyanato or a sulfo substituted radical. As will be obvious to those skilled in the art, there can be one or more of the various substituents in any one Q radical and in various combinations therein. The hydrocarbon and amino substituted hydrocarbon radicals containing from 1 to 7 carbon atoms are the preferred Q radicals.

The X radical can be any readily hydrolyzable radical. Thus X can be, for example, an alkoxy radical containing from 1 to 3 carbon atoms, an acycloxy radical containing from 1 to 3 carbon atoms, a $-OCH_2CH_2OR$ radical wherein R is a hydrogen atom or an aliphatic hydrocarbon radical containing from 1 to 3 carbon atoms, an oxime radical containing from 1 to 4 carbon atoms, a $-NR'_2$ radical wherein each R' is a hydrogen atom, or an alkyl radical containing from 1 to 2 carbon atoms, or X can be a halogen atom. Specific examples of X include the methoxy, ethoxy, propoxy, formyloxy, acetoxy, propionoxy, $-OCH_2CH_2OH$, $-OCH_2CH_2OCH_3$, $$-OCH_2CH_2OC_2H_5$$
$$-OCH_2CH_2OCH_2CH=CH_2$$

$-O-N=C(CH_3)_2$, $-O-N=C(CH_3)(C_2H_5)$, $-NH_2$, $-NH(CH_3)$, $-N(CH_3)_2$ and $-NH(C_2H_5)$ radicals and the fluorine, chlorine, bromine and iodine atoms. It is preferred that X be an alkoxy radical.

The silanes employed in the process of this invention are known compounds, many of them being commercially available materials.

The alkali metal monoalkyl siliconates (or silanolates as they are sometimes called) are also well-known compounds. The alkali metal can be, for example, sodium, lithium or potassium. The alkyl group can have from 1 to 4 carbon atoms and thus can be a methyl, ethyl, propyl or butyl group. The preferred compound for use in accordance with this invention is sodium monomethyl siliconate.

The silane or siliconate can be applied to the surface of the unset concrete by any suitable means. For example, they can be dabbed, brushed or sprayed on the concrete. The silane can be applied in the form of a neat liquid or a solvent or aqueous solution. The amount of the silane in any solution is not critical and can vary from about 0.1 to 25%. However, when the concentration of the silane is appreciable, instability and foaming of the solutions may be problems. Generally speaking, when a solution is employed it is preferred that the concentration of the silane be in the range of 1 to 10%. It is preferred to spray a freshly prepared aqueous solution of the silane on the concrete. The siliconates are generally supplied in the form of aqueous solutions or dispersions containing about 30% silicone solids. Generally speaking it is preferred to dilute these solutions or dispersions to a 1 to 10% solids level for use. The silane and siliconate must be applied to the concrete within about 2 hours after it has been screeded. This is long before the concrete has taken its final set which normally occurs after 6 to 8 hours in the absence of any set accelerating or retarding material. If so desired, the silane or siliconate can be used as a troweling aid. Also, if a membrane curing compound is to be employed as the means to control the evaporation of the moisture, the silane or siliconate can be applied in admixture therewith. It is believed at this time that in general the earlier the silane or siliconate is applied to the fresh concrete surface, after the surface has been screeded, the better will be the results obtained. It appears that ideally the silane or siliconate should be applied while there is still some surface water on the concrete.

The amount of silicone solids applied to the surface of the concrete can vary widely. For example, as little as 15 g. of silicone solids per 100 square feet of concrete surface will give some improvement. Usually, however, it is preferred that at least 40 g. of silicone solids per 100 square feet of concrete surface be applied. Application of more than about 100 g. per 100 square feet, while not detrimental, generally provides no added benefits and is wasteful.

While the use of moisture control means to prevent the excessive loss of moisture, by evaporation, during the curing of the concrete is not essential to obtain the benefits of the instant invention, it is a common practice in the art to use such means, and it is believed preferable to use a moisture control means in order to obtain the best results in accordance with this invention. The moisture control means employed can be, for example, one of the membrane curing compounds which are simply resin solutions which are applied to the concrete surface, usually by spraying on after the surface has been finished, and which forms a film over the concrete surface which controls the rate of evaporation of the water from the concrete. Other moisture control means that are conventionally employed, and hence can be used in the process of this invention, include plastic films or sheets, burlap sacks, and straw, all of which are used to cover the fresh concrete surface.

Regardless of the amount of silicone solids applied to the concrete surface, and regardless of whether or not the silicone is applied alone or in combination with a membrane curing compound, the amount of membrane curing compound applied will always be sufficient to form a film on the surface.

Now in order that those skilled in the art may better understand how the present invention can be practiced, the following examples are given by way of illustration and not by way of limitation.

In the examples the method used to evaluate the concrete surface was similar to the one employed by the Portland Cement Association and the U.S. Bureau of Public Roads. This method is described by Verbeck et al. in the Highway Research Board Bulletin 150 (1957), pages 1 to 13. Procedure 2 of the test was employed with the following exceptions. The specimens used were slabs 2″ in depth and 5″ x 9″ in surface area. The slabs were cast in oiled wood molds and a 2% sodium chloride solution was used instead of water. Also, a freeze-thaw cycle of −17° F. to 70° F. was employed. The slabs were rated on a scale of from 0 to 10 as follows: 0 equals no scaling, 1 equals local slight scaling, 2 equals general slight scaling, 3 equals local moderate scaling, 4 equals general moderate scaling, 5 equals local moderately severe scaling, 6 equals general moderately severe scaling, 7 equals local severe scaling, 8 equals general severe scaling, 9 equals local very severe scaling and 10 equals general very severe scaling of the slab.

EXAMPLE 1

An air entrained concrete was prepared in the conventional manner and scaling slabs poured. This concrete has a 2″ slump, an air content of 6.2% and a water to cement ratio of 0.51. The surfaces of the concrete slabs were finished, allowed to stand one hour, and then the surfaces treated with 5% (silicone solids) aqueous solutions of the silicones applied at the rate of one gallon per 300 square feet. The particular surface treatment and the test results are set forth in the table below.

| Surface treatment | Scaling rating after X cycles | | | | |
|---|---|---|---|---|---|
| | 5 | 10 | 20 | 40 | 60 |
| None [1] | 4 | 4 | 4 | 5 | 6 |
| Sodium monomethyl siliconate | 0 | 1 | 2 | 3 | 4 |
| $H_2NCH_2CH_2NH(CH_2)_3Si(OCH_3)_3$ | 0 | 0 | 0 | 1 | 2 |

[1] Included for comparison.

EXAMPLE 2

The procedure of Example 1 was repeated except that this concrete had a 2½″ slump, an air content of 3.4% and a water to cement ratio of 0.50. The Pliolite S5B is a commercial styrene-butadiene resin, used to form a membrane over the concrete to prevent the excessive loss of moisture during the curing of the concrete, and was applied in admixture with the silane. The particular surface treatment and the scaling rating after 49 cycles is set forth in the table below.

| Surface treatment: | Scaling rating |
|---|---|
| None [1] | 6 |
| $H_2NCH_2CH_2NH(CH_2)_3Si(OCH_3)_3$ | 3 |
| Acetate salt of $H_2NCH_2CH_2NH(CH_2)_3Si(OCH_3)_3$ [2] | 2 |
| $H_2NCH_2CH_2NH(CH_2)_3Si(OCH_3)_3$ - Pliolite S5B mixture | 4 |

[1] Included for comparison.
[2] Applied as a 2½% solution.

EXAMPLE 3

The procedure of Example 2 was repeated except that this concrete had a 5¼″ slump, an air content of 8.5% and a water to cement ratio of 0.51. The particular surface treatment and the scaling rating after 47 cycles is set forth in the table below.

| Surface treatment: | Scaling rating |
|---|---|
| None [1] | 5 |
| $H_2NCH_2CH_2NH(CH_2)_3Si(OCH_3)_3$ | 4 |
| Acetate salt of $H_2NCH_2CH_2NH(CH_2)_3Si(OCH_3)_3$ [2] | 3 |
| $H_2NCH_2CH_2NH(CH_2)_3Si(OCH_3)_3$ - Pliolite S5B mixture | 2 |

[1] Included for comparison.
[2] Applied as a 2½% solution.

EXAMPLE 4

The procedure of Example 1 was repeated except that this concrete had a 2⅞″ slump, an air content of 5% and a water to cement ratio of 0.43. The particular surface treatment and the test results are set forth in the table below.

| Surface treatment | Scaling rating after X cycles | | |
|---|---|---|---|
| | 5 | 17 | 21 |
| None [1] | | 4 | |
| $H_2NCH_2CH_2NH(CH_2)_3Si(OCH_3)_2CH_3$ [1] | 4 | | |
| $H_2NCH_2CH_2NH(CH_2)_3Si(OCH_3)_3$ | 0 | 0 | 0 |
| $C_6H_5Si(OCH_3)_3$ | 0 | 0 | 0 |

[1] Included for comparison.

EXAMPLE 5

When the following silanes are substituted for the silanes in Examples 1 or 2, a concrete is obtained which has a surface that is resistant to scaling and spalling.

(A) $CH_3Si(OCH_3)_3$
(B) $CH_3Si(OCH_2CH_2OCH_3)_3$
(C) $CH_3Si(OCH_2CH_2OH)_3$
(D) $CH_3Si[OCH(CH_3)_2]_3$
(E) $C_4H_9Si(OCH_3)_3$
(F) $C_{12}H_{25}Si(OCH_3)_3$
(G) $CH_2=CHSi(OCH_3)_3$
(H) $H_2NCH_2CH_2NHCH_2CH(CH_3)CH_2Si(OCH_3)_3$
(I) $H_2N(CH_2)_3Si(OC_2H_5)_3$
(J) $H_2C=C(CH_3)COO(CH_2)_3Si(OCH_3)_3$
(K) $H_2C\overset{O}{\underset{\diagup\diagdown}{-}}CHCH_2O(CH_2)_3Si(OCH_3)_3$
(L) $F_3CCH_2CH_2Si(OCH_3)_3$
(M) $Cl_2C_6H_3Si(OCH_3)_3$
(N) $HCl \cdot H_2NCH_2CH_2NH(CH_2)_3Si(OCH_3)_3$
(O) $(CH_3O)_2\overset{O}{\overset{\|}{P}}-O-(CH_2)_3Si(OCH_3)_3$
(P) $(HOCH_2CH_2)_2NCH_2CH(OH)CH_2O(CH_2)_3Si(OCH_3)_3$
(Q) $NC(CH_2)_3Si(NH_2)_3$
(R) $CH_3Si(OOCCH_3)_3$ (S) $CH_3Si[ON{=}C(CH_3)(C_2H_5)]_3$
(T) $H_2C{=}C(CH_3)COO(CH_2)_3SiCl_3$
(U) $CH_3CH_2SCH_2CH_2Si(OCH_3)_3$

EXAMPLE 6

When the following siliconates are substituted for the siliconate of Example 1, a concrete is obtained which has a surface that is resistant to scaling and spalling.

(A) potassium monoethyl siliconate
(B) lithium monopropyl siliconate
(C) sodium monobutyl siliconate
(D) cesium monomethyl siliconate
(E) potassium monomethyl siliconate Essentially identical results when the above siliconates are employed and either a membrane curing compound or a polyethylene sheet is used to control the evaporation of the moisture from the concrete.

That which is claimed is:

1. In a process of pouring concrete, the improvement which comprises applying to the surface of the concrete within about 2 hours after it has been screeded, a compound selected from the group consisting of (1) silanes having the general formula $QSiX_3$ wherein Q is a hydrocarbon or substituted hydrocarbon radical and X is a readily hydrolyzable radical, and (2) an alkali metal monoalkyl siliconate having from 1 to 4 carbon atoms in the alkyl group, whereby the surface of the concrete is rendered resistant to scaling and spalling.

2. The process of claim 1 wherein the compound is a silane (1) and Q contains from 1 to 7 carbon atoms.

3. The process of claim 2 wherein Q is a hydrocarbon radical and X is an alkoxy radical.

4. The process of claim 3 wherein Q is a methyl radical and X is a methoxy radical.

5. The process of claim 3 wherein Q is a phenyl radical and X is a methoxy radical.

6. The process of claim 2 wherein Q is a substituted hydrocarbon radical and X is an alkoxy radical.

7. The process of claim 6 wherein Q is a

—$(CH_2)_3NHCH_2CH_2NH_2$ radical and X is a methoxy radical.

8. The process of claim 6 wherein Q is the acetate salt of a —$(CH_2)_3NHCH_2CH_2NH_2$ radical and X is a methoxy radical.

9. The process of claim 6 wherein Q is a

—$CH_2CH(CH_3)CH_2NHCH_2CH_2NH_2$ radical and X is a methoxy radical.

10. The process of claim 1 wherein the compound is a siliconate (2).

11. The process of claim 10 wherein the siliconate is sodium monomethyl siliconate.

12. In a process of pouring concrete which includes the use of moisture control means to prevent the excessive loss of moisture during the curing of the concrete, the improvement which comprises applying to the surface of the concrete, within about 2 hours after it has been screeded but not later than when the moisture control means is applied, a compound selected from the group consisting of (1) silanes having the general formula $QSiX_3$ wherein Q is a hydrocarbon or substituted hydrocarbon radical and X is a readily hydrolyzable radical, and (2) an alakli metal monoalkyl siliconate having from 1 to 4 carbon atoms in the alkyl group, whereby the surface of the concrete is rendered resistant to scaling and spalling.

13. The process of claim 12 wherein the compound is a silane (1) and Q contains from 1 to 7 carbon atoms.

14. The process of claim 13 wherein Q is a hydrocarbon radical and X is an alkoxy radical.

15. The process of claim 14 wherein Q is a methyl radical and X is a methoxy radical.

16. The process of claim 14 wherein Q is a phenyl radical and X is a methoxy radical.

17. The process of claim 13 wherein Q is a substituted hydrocarbon radical and X is an alkoxy radical.

18. The process of claim 17 wherein Q is a

—$(CH_2)_3NHCH_2CH_2NH_2$ radical and X is a methoxy radical.

19. The process of claim 17 wherein Q is the acetate salt of a —$(CH_2)_3NHCH_2CH_2NH_2$ radical and X is a methoxy radical.

20. The process of claim 17 wherein Q is a

—$CH_2CH(CH_3)CH_2NHCH_2CH_2NH_2$ radical and X is a methoxy radical.

21. The process of claim 12 wherein the compound is a siliconate (2).

22. The process of claim 21 wherein the siliconate is sodium monomethyl siliconate.

References Cited

UNITED STATES PATENTS

| | | | |
|---|---|---|---|
| 2,507,200 | 5/1950 | Elliott et al. | 106—287UX |
| 2,713,545 | 7/1955 | Kather | 106—287X |
| 2,814,572 | 11/1957 | Frye | 117—124 |
| 2,905,562 | 9/1959 | Brown | 106—12 |
| 2,971,861 | 2/1961 | Reese et al. | 117—54 |
| 2,971,864 | 2/1961 | Speier | 117—287X |
| 3,067,051 | 12/1962 | Oppegard et al. | 106—287X |
| 3,318,717 | 5/1967 | Simpson | 106—287 |

LORENZO B. HAYES, Primary Examiner

U.S. Cl. X.R.

106—287; 117—123; 264—79